United States Patent
Stoeckel et al.

(10) Patent No.: US 11,512,164 B2
(45) Date of Patent: Nov. 29, 2022

(54) COMPOSITE MATERIAL COMPRISING A POLYURETHANE-POLYACRYLATE RESIN MATRIX

(71) Applicant: Covestro Deutschland AG, Leverkusen (DE)

(72) Inventors: Nicolas Stoeckel, Cologne (DE); Marcel Schornstein, Neuss (DE); Kai Laemmerhold, Aachen (DE); Guobin Sun, Shanghai (CN)

(73) Assignee: Covestro Deutschland AG, Leverkusen (DE)

(*) Notice: Subject to any disclaimer, the term of this patent is extended or adjusted under 35 U.S.C. 154(b) by 308 days.

(21) Appl. No.: 16/644,199

(22) PCT Filed: Sep. 12, 2018

(86) PCT No.: PCT/EP2018/074605
§ 371 (c)(1),
(2) Date: Mar. 4, 2020

(87) PCT Pub. No.: WO2019/053061
PCT Pub. Date: Mar. 21, 2019

(65) Prior Publication Data
US 2021/0061942 A1    Mar. 4, 2021

(30) Foreign Application Priority Data

Sep. 12, 2017 (WO) .............. PCT/EP2017/101384

(51) Int. Cl.
*C08G 18/76* (2006.01)
*C08G 18/48* (2006.01)
*C08G 18/67* (2006.01)
*C08K 5/01* (2006.01)

(52) U.S. Cl.
CPC ..... *C08G 18/7671* (2013.01); *C08G 18/4829* (2013.01); *C08G 18/672* (2013.01); *C08K 5/01* (2013.01)

(58) Field of Classification Search
CPC ............ C08G 18/7671; C08G 18/4829; C08G 18/672; C08K 5/01
See application file for complete search history.

(56) References Cited

U.S. PATENT DOCUMENTS

| | | | |
|---|---|---|---|
| 4,560,456 A | 12/1985 | Heil et al. | |
| 6,136,883 A | 10/2000 | Yang | |
| 6,767,986 B2 | 7/2004 | Moethrath et al. | |
| 7,790,804 B2 | 9/2010 | Brockelt et al. | |
| 8,168,260 B2 | 5/2012 | Limerkens et al. | |
| 9,085,990 B2 | 7/2015 | Lindner et al. | |
| 9,284,401 B2 | 3/2016 | Lorenz et al. | |
| 9,808,969 B2 | 11/2017 | Lindner et al. | |
| 10,293,586 B2 | 5/2019 | Passmann et al. | |
| 10,344,130 B2 | 7/2019 | Sun et al. | |
| 2008/0300338 A1 | 12/2008 | Wagner et al. | |
| 2011/0201716 A1 | 8/2011 | Gehinger et al. | |
| 2014/0087196 A1 | 3/2014 | Lindner et al. | |
| 2017/0037203 A1 | 2/2017 | Sun et al. | |
| 2017/0130019 A1* | 5/2017 | Sun ................. | C08G 18/6666 |

FOREIGN PATENT DOCUMENTS

| | | | | |
|---|---|---|---|---|
| EP | 2910585 A1 | 8/2015 | | |
| WO | WO-2015155195 A1 * | 10/2015 | .......... | C08F 290/067 |

OTHER PUBLICATIONS

International Search Report, PCT/EP2018/074605, dated Dec. 19, 2018, Authorized officer: Max Bernhardt.
"Chemistry and Technology of Polyols for Polyurethanes", Rapra Technology Limited, Shawbury 2005, p. 31 ff. (Chap. 3: The General Characteristics of Oligo-Polyols; p. 55 ff. (Chap. 4: Oligopolyols for Elastic Polyurethanes); p. 263ff. (Chap. 8: Polyester Polyols for Elastic Polyurethanes); and, in particular, to p. 321 ff. (Chap. 13: Polyether Polyols for Rigid Polyurethane Foams) and p. 419 ff. (Chap. 16: Polyester Polyols for Rigid Polyurethane Foams).
"Kunststoff-Handbuch", vol. VII "Polyurethanes", 3. Edition, Carl Hanser Verlag, Munich / Vienna, 1993, pp. 57-67, 88-90.
Chapter 3, Handbook of Polyurethane Raw Materials and Aids (Liu Yijun, published on Apr. 1, 2005).
Chapter 2, Polyurethane Elastomer (Liu Houjun, published in Aug. 2012).

* cited by examiner

Primary Examiner — Rabon A Sergent
(74) Attorney, Agent, or Firm — Jed C. Benson

(57) ABSTRACT

The present invention relates to an isocyanate-reactive component B) comprising: B1) one or more organic polyols selected from the group consisting of polyether polyols, polyester polyols, polyetherester polyols, polymer polyols, polycarbonate polyols and polyethercarbonate polyols; B2) one or more compounds having the structure of Formula (I) wherein $R^1$ is selected from the group consisting of hydrogen, methyl or ethyl; $R^2$ is selected from the group consisting of alkylene having 2 to 6 carbon atoms, 2,2-bis(4-phenylene)propane, 1,4-bis(methylene)benzene, 1,3-bis(methylene)benzene, 1,2-bis(methylene)benzene; n is an integer selected from 1 to 6; and B3) at least one radical reaction adjuvant selected from the group consisting of aryl-substituted olefins, a composite material comprising a thermosetting polyurethane-polyacrylate resin matrix made with such isocyanate-reactive component B) and a reinforcement material and a process of preparing the same.

13 Claims, No Drawings

COMPOSITE MATERIAL COMPRISING A POLYURETHANE-POLYACRYLATE RESIN MATRIX

CROSS-REFERENCE TO RELATED APPLICATION

This application is a national stage application under 35 U.S.C. § 371 of PCT/EP2018/074605, filed Sep. 12, 2018, which claims the benefit of International Application No. PCT/CN2017/101384, filed Sep. 12, 2017, each of which is incorporated herein by reference.

FIELD

The present invention relates to a composite material comprising a thermosetting polyurethane-polyacrylate resin matrix and a reinforcement material and a process of preparing the same.

BACKGROUND

A composite material is a heterogeneous combination of non-miscible materials: one or more reinforcement materials giving mechanical properties and a matrix, e.g. a polymer, that ensures cohesion of the entire composite structure.

Thus, polyurethane resins are being increasingly applied as matrix material for the production of composite materials, e.g. rotor blades for wind turbines, at present (see e.g. WO 2011/069975 A1). In order to create a continuous matrix throughout the entire structure, the matrix should maintain a low viscosity and long gel time or pot-life throughout the infiltration of the reinforcement. Then, after infiltration of the reinforcement materials, a fast setting/cure of the material is crucial for easy handling and processing. The curing of the resin should yield a high degree of conversion as this ensures consistent mechanical properties throughout the life time of the composite material and safe handling. The use of standard polyurethane resins for large composite parts however is restricted by the rather short pot-life and high initial viscosities.

In this application, the term "pot-life" means the time in which the reactive composition has a viscosity@25° C.<600 mPa*s, based on DIN EN ISO 2555.

To overcome these deficiencies, such as short pot-life, overly high initial viscosity, and the like, of the traditional polyurethane, various modifications for standard polyurethane resins have been proposed in the literature. For example, the addition of epoxies (WO 2012/022683 A) and the use of glycerol-based polypropylene oxide polyethers (WO 2012/113748 A) and/or dianhydrohexitol (WO 2012/163845 A) in the polyol formulation.

Recently, the preparation of large composite parts made from a polyurethane resin matrix comprising urethane structures and polymerized acrylates has been described ("polyurethane-polyacrylate resin"). WO 2015/155195 A discloses the preparation of a polyurethane-polyacrylate reactive composition from isocyanates, hydroxyl acrylates and polyols which react in such a way, that the addition polymerization reaction of isocyanate groups and hydroxyl groups and the radical polymerization of olefinic groups take place simultaneously ("one-pot process"). By this, a homogenous network of polyurethanes and polyacrylates is formed, and the reactive composition has a sufficient long pot life, which allows for the processing of large composite parts. The resulting homogeneous polymer structure distinguishes the one-pot synthesized polyurethane-polyacrylate polymer, from the prior art (WO 2007/144292 A, U.S. Pat. No. 4,560,456) where heterogeneous polyurethane-polyacrylate polymers are formed in a two-step approach (initial polyurethane formation, followed by a radical cross-linking), which exhibit a structure with capsulated polyurethane micro-domains.

Also, the introduction of some other chemical reaction different from that for the formation of urethane bond can help overcoming some shortages, such as short gel time, overly high initial viscosity, and the like, of the traditional polyurethane.

For the simultaneous formation of polyurethane-linkage and radical polymerization in the composite structure, the reaction conditions for the preparation of the polyurethane-polyacrylate hybrid resin matrix need to be carefully adjusted. Inevitably, competition between the polyaddition reaction of the urethane bond and the radical polymerization as well as side reactions occurs. WO 2015/155195 A describes that the simultaneous polyaddition and radical polymerization is controllable by the use of catalysts specific for the urethane bonds, and the use of initiators in combination with accelerators and inhibitors specific for the radical polymerization. Suitable catalysts for the urethane bond formation are preferably amine catalysts, organometallic catalysts or a mixture thereof. Whereas suitable initiators for the radical polymerization are preferably peroxides, persulfides, peroxycarbonates, peroxyboric acid, azo compounds or other suitable radical initiators that can initiate curing of an olefin-containing compound. Optionally, one or more accelerators of the radical polymerization may also be present, such as cobalt compounds or amine compounds. Inhibitors of the radical reaction are preferably phenol, quinine or hindered amine compounds, examples of which include methylhydroquinone, benzoquinone, polymethyl piperidine derivatives, low valence copper ions, etc. However, with the one-pot processes of the prior art, the results with regard to conversion ratios are not yet satisfying.

Thus, there is still the need for a polyurethane-polyacrylate hybrid resin useful as matrix material for the production of large composite parts exhibiting high degree of conversion and thereby consistent mechanical properties throughout the life time of the composite material. At the same time, the pot-life of the reactive composition for the matrix material should still be sufficient long to ensure easy and complete processing, e.g. by vacuum infusion of the reinforcement material, to produce the composite.

SUMMARY

It has now surprisingly been found that the problems of the prior art may be overcome by the addition of certain adjuvants, which can effectively adjust the conversion ratio of the polycondensation reaction of urethane bond so that the amount of the residual isocyanate bond groups after reaction is reduced, decreasing the risk of aging of the material and extending the life of the material. At the same time, the technology according to the invention provides more flexibility for adjusting the properties of polyurethane polyurethane-polyacrylate matrix material.

The present invention thus claims an isocyanate-reactive component B) comprising:
   B1) one or more organic polyols selected from the group consisting of polyether polyols, polyester polyols, polyetherester polyols, polymer polyols, polycarbonate polyols and polyethercarbonate polyols;
   B2) one or more compounds having the structure of Formula (I)

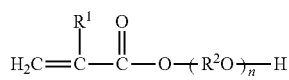

wherein, $R^1$ is selected from the group consisting of hydrogen, methyl or ethyl; $R^2$ is selected from the group consisting of alkylene having 2 to 6 carbon atoms, 2,2-bis(4-phenylene)-propane, 1,4-bis(methylene)benzene, 1,3-bis(methylene)benzene, 1,2-bis(methylene)benzene; n is an integer selected from 1 to 6; and B3) at least one radical reaction adjuvant selected from the group consisting of aryl-substituted olefins.

With the inventive isocyanate-reactive composition B), a polyurethane-polyacrylate reactive composition may be prepared by mixing component B) with an isocyanate component A) comprising one or more polyisocyanates in presence of radical reaction initiator C), which shows, after reacting A) and B) in a one-pot process, a higher NCO-conversion ratio than a comparable isocyanate reactive component not containing an adjuvant B3).

DETAILED DESCRIPTION

For the purpose of this application, the term "polyisocyanate" is used for an organic compound containing two or more isocyanate groups (—N═C═O).

The term "functionality" or "f" when used in this application means the average functionality (number of Zerewitinoff-active hydrogen atoms per molecule) of a polyol or a polyol mixture on the assumption that it is identical to the average functionality (number of active hydrogen atoms per molecule) of the initiator(s) used during preparation of the polyol.

The term f(olefin), with regard to a compound, means the average number of reactive olefin-groups in the respective compound.

For the purpose of this application, the term "one-pot process" is used for a process, wherein the components A), B1), B2) and B3) are mixed to form one set of educts, the reaction between these components is started in presence of C) and the reaction conditions are chosen in such a manner, that urethane formation and radical olefin polymerization take place simultaneously or at least partly in parallel. Generally, upon mixing all components, the initiation of the polyurethane addition is followed by the radical polymerization reaction at elevated temperature (depending on the thermal lability of the initiator C). Both reactions reach their maximum conversion ratio once the curing process is done. No intermediates are isolated in between.

The one or more organic polyols B1) are preferably selected from the group consisting of polyether polyols, polyester polyols, polyetherester polyols, polymer polyols, polycarbonate polyols and polyethercarbonate polyols. Polyether polyols and/or polyester polyols are particularly preferably used in the polyol formulation. The use of polyether polyols as only polyols or in mixture with polyester polyols is especially preferred.

The polyols are described, for example, by Ionescu in "Chemistry and Technology of Polyols for Polyurethanes", Rapra Technology Limited, Shawbury 2005, p. 3 1 ff. (Cap. 3: The General Characteristics of Oligo-Polyols, p. 55 ff. (Cap. 4: Oligo-polyols for Elastic Polyurethanes). P. 263ff. (Cap. 8: Polyester Polyols for Elastic Polyurethanes) and, in particular, to page 32 ff. (Cap. 13: Polyether Polyols for Rigid Polyurethane Foams) and S. 419 ff. (Cape. 16: Polyester Polyols for Rigid Polyurethane Foams).

In a preferred embodiment, the hydroxyl number of the polyols is between 150-700 mg KOH/g, more preferably 200-450 mg KOH/g and even more preferably 200-330 mg KOH/g.

The average functionality of the polyols in B1) is preferably 1.5-4.5, more preferably 1.8-3.7, still preferably 1.9-3.2 and even more preferably 2.1-2.8.

Values for the hydroxyl number (herein "OH-value") given in this application are measured according DIN EN ISO 53240, part 2 (November 2007).

Preference is given to the use of one or more polyhydroxypolyethers ("polyether polyols") as component B1), which may be prepared by polyaddition of alkylene oxides such as propylene oxide and/or ethylene oxide onto polyfunctional starter compounds in the presence of catalysts, in a manner known by the skilled in the art. The polyhydroxypolyethers are preferably prepared from a starter compound and one or more alkylene oxides, for example, ethylene oxide, butylene oxide and/or propylene oxide. Preferred starter compounds are molecules having 2 to 8 hydroxyl groups per molecule such as water, ethylene glycol, propylene glycol, diethylene glycol, dipropylene glycol, triethylene glycol, tripropylene glycol, 1,4-butanediol, 1,6-lexanediol, bisphenol A, glycerol, trimethylolpropane, pentaerythritol, sorbitol and sucrose and aminic starter compounds, such as, for example, ethylenediamine and triethanolamine. The starter compounds may be used alone or in admixture.

Particular preference is given to 1,2- and 1,3-propylene glycol, diethylene glycol, sorbitol, glycerol, trimethylolpropane, sucrose and mixtures of the abovementioned products as starter materials.

Polyether polyols based on propylene oxide are particularly preferred, specifically propylene oxide polyethers with a functionality of 2-3. For those polyethers, glycerol and/or trimethylpropane are particularly preferred as starter compound.

Polyester polyols are ester-containing polyhydroxyl compounds, e.g. castor oil or polyhydroxy polyesters, such as are obtainable by polycondensation of excess amounts of simple polyhydric alcohols of the type abovedescribed, with preferably dibasic carboxylic acids or their anhydrides. The dibasic carboxylic acid is preferably but not limited to an aliphatic carboxylic acid having 2-12 carbons, preferably but not limited to succinic acid, malonic acid, glutaric acid, adipic acid, suberic acid, azelaic acid, sebacic acid, dodecyl carboxylic acid, maleic acid, fumaric acid, phthalic acid, isophthalic acid, terephthalic acid, or a combination thereof. Anhydride of the respective acids may also or alternatively used as educts. Monobasic acids, e.g. benzoic acid or alcanoic acids and/or acids prepared from hydroxyl carboxylic acids, e.g. hydroxy caproic acid, hydroxy butyric acid, hydroxy stearic acid, hydroxyl decanoic acid, and the like, may be used in addition. The polyester polyol also include polyester polyols prepared from or with lactones, e.g. ε-caprolactone, butyrolactone and the like.

Examples for polyhydric alcohols to react with the acids are ethylene glycol, diethylene glycol, 1,2-propanediol, 1,3-propanediol, dipropylene glycol, 1,3-methylpropanediol, 1,4-butanediol, 1,5-pentanediol, 1,6-hexanediol, neopentyl glycol, 1,10-decanediol, glycerine, trimethylolpropane, or a combination thereof. Monools may be used in addition.

Biobased compounds and/or derivates thereof may also be used for the production of polyester polyols, e.g. vegetable oils, vegetable oil polyols or modified products thereof. Vegetable oil is a compound prepared from an unsaturated fatty acid and glycerine, or an oil extracted from e.g. plant fruits or seeds. Examples include but are not limited to castor oil, polyhydroxy-fatty acids, rinoleic acid, grape seed oil, pumpkin seed oil, palm oil, olive oil, avocado oil, coconut oil, palm kernel oil, coco butter, cotton seed oil, pumpkin seed oil, maize oil, sunflower seed oil, wheat germ oil, sesame oil, hemp oil, thistel oil, linseed oil, soybean oil, peanut oil, lupin oil, borrage oil, mustard oil, jatropha oil, walnut oil, jojoba oil, lecithin, e.g. based on soya, primrose oil, wild rose oil, peanut oil, walnut oil, hazelnut oil, canola oil and castor oil etc., Fatty acids, hydroxyl modified fatty acids, polyhydroxy-fatty acids and epoxized fatty acids and fatty acid esters, e.g. based on myristoleic acid, palmitoleic acid, oleic acid, vaccenic acid, petroselic acid, gadoleic acid, erucic acid, nervonic acid, linoleic acid, alpha- and gamma-linoleic acid, stearidonic acid, arachidonic acid, timnodonic acid, clupanodonic acid and cervic acid. Also advantageous is the use of mixtures of such biobased acids with other carboxylic acids, e.g. phthalic acids. Hydroxyl groups may further be introduced into the starter of a vegetable oil polyol by a process such as cracking, oxidation or transesterification, and then the vegetable oil polyols may be prepared using a process known to one skilled in the art for preparing an organic polyol. Esters prepared from ricinoic acid with polyfunctional alcohols are especially preferred when using biobased polyols.

The polyester polyol used in compound B1), alone or in mixture with e.g. polyether polyols, has preferably a molecular weight of 200-3000 g and a functionality of 2-6, preferably 2-4, more preferably 2-3.

Other polyols may be used for component B1), preferably in admixture with the above described polyether polyols and/or polyester polyols:

Polycarbonate polyols are polycarbonates containing hydroxyl groups, for example polycarbonate diols. They are obtained in the reaction of carbonic acid derivatives, such as diphenyl carbonate, dimethyl carbonate or phosgene, with polyols, preferably diols. Examples of such diols are ethylene glycol, 1,2- and 1,3-propanediol, 1,3- and 1,4-butanediol, 1,6-hexanediol, 1,8-octanediol, neopentyl glycol, 1,4-bishydroxymethylcyclohexane, 2-methyl-1,3-dipropylene glycol, 2,2,4-trimethylpentandiol, polypropylene glycols, dibutylene glycol, polybutylene glycols, bisphenols and lactone-modified diols. Examples for polycarbonate diols and their production may e.g. be found in EP 1359177 A.

Polyethercarbonate polyols may be prepared by addition of carbon dioxide and an alkylene oxide compound to a starter comprising active hydrogen, may also be used in the invention. Examples for polyethercarbonate polyols and their production may e.g. be found in EP 2910585 A, [0024]-[0041].

Polymer polyols are a polymer modified polyether polyols, preferably a grafted polyether polyol, or a polyether polyol dispersion. Examples for polymer polyols and their manufacturing may e.g. be found in pages 89 p., "Kunststoff-Handbuch", Vol. VII "Polyurethanes", 3. Edition, Carl Hanser Verlag, Munich/Vienna, 1993, pages 88-90 and EP 1 873 170 A1.

Polyetherester polyols are polyhydroxy polymers containing ether groups and polyester groups. They may, for example, be produced from the reaction dicarboxylic acids or their derivatives and polyetherpolyols, as described herein, or via epoxidation of starter compounds containing ester groups. Examples of polyetheresters and their synthesis have been described in WO 2010/043624 A and EP 1 923 417 A. Polyetherester polyols may also and advantageously be produced from biobased sources, e.g. from natural oil based acids, esters and polyols, as described herein.

Exemplary representatives of component B1) are furthermore also described in "Kunststoff-Handbuch", Vol. VII "Polyurethanes", 3. Edition, Carl Hanser Verlag, Munich/Vienna, 1993, pages 57-67.

Preferably, the amount of B1) is 25 to 45 wt. %, based on the total weight of said polyurethane-polyacrylate composition. A further preferred amount of B1) is 30 to 80 wt. %, based on the total weight of the isocyanate-reactive component B) as 100 wt. %, even more preferred 40-65 wt.-%, based on the total weight of the isocyanate-reactive component B) as 100 wt. %.

The isocyanate-reactive component B) further comprises acrylate monomers B2) having the structure of Formula (I)

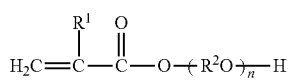

wherein, $R^1$ is selected from the group consisting of hydrogen, methyl or ethyl; $R^2$ is selected from the group consisting of alkylene having 2 to 6 carbon atoms, 2,2-bis(4-phenylene)-propane, 1,4-bis(methylene)benzene, 1,3-bis(methylene)benzene, 1,2-bis(methylene)benzene; n is an integer selected from 1 to 6.

In a preferred embodiment, the hydroxyl number of the acrylate monomer is between 150-700 mg KOH/g and more preferably 220-600 mg KOH/g and still more preferably 300-500 mg KOH/g, the average hydroxyl functionality of B2) is 1-3, more preferably 1-2, still more preferably 1, and the average olefin functionality of B2) is 1-3, more preferably 1-2, still more preferably 1. Preferably, B2) is selected from the group consisting of component is selected from the group consisting of hydroxyethyl methacrylate, hydroxypropyl methacrylate, hydroxybutyl methacrylate, hydroxyethyl acrylate, hydroxypropyl acrylate, hydroxybutyl acrylate, or combinations thereof, especially preferably from the group consisting of hydroxyethyl methacrylate, hydroxypropyl methacrylate, hydroxybutyl methacrylate, and combinations thereof.

B2) may be prepared using a conventional methods in the art, e.g. by esterification reaction between (meth)acrylic anhydride, (meth)acrylic acid or (meth)acryloyl halide and HO—(R2O)n—H. These methods are known to one skilled in the art. See, for example, the description in Chapter 3, Handbook of Polyurethane Raw Materials And Aids (Liu Yijun, published on Apr. 1, 2005) and Chapter 2, Polyurethane Elastomer (Liu Houjun, published in August, 2012), which are incorporated herein in their entirety by reference.

Preferably, the amount of B2) is 21 to 75 wt. %, based on the total weight of said isocyanate-reactive component B) as 100 wt. %.

Component B3) is an aryl-substituted olefin, preferably a diaryl-substituted olefin. Diaryl-substituted ethylenes like diphenylethylene (DPE) are especially preferred.

Preferably, the amount of B3) is 0.1 to 12 wt. %, more preferably 0.2 to 10 wt. %, based on the total weight of said isocyanate-reactive component B) as 100 wt. %. If too much adjuvant is added, a negative influence on the physical properties may be found.

Compounds B1, B2 and B3 are mixed with an isocyanate component A) comprising one or more polyisocyanates in presence of radical reaction initiator C) and the resulting polyurethane-polyacrylate reactive composition is reacted in a one-pot process as defined above. Surprisingly, in such one-pot process a higher NCO-conversion ratio than a comparable isocyanate reactive component not containing an adjuvant B3) is observed.

As polyisocyanate component A), the conventional aliphatic, cycloaliphatic and in particular aromatic di- and/or poly-isocyanates may be used. Examples of such polyisocyanates which are suitable are 1,4-butylene diisocyanate, 1,5-pentane diisocyanate, 1,6-hexamethylene diisocyanate (HDI), isophorone diisocyanate (IPDI), 2,2,4- and/or 2,4,4-trimethylhexamethylene diisocyanate, bis(4,4'-isocyanatocyclohexyl)methane or mixtures thereof with the other isomers, 1,4-cyclohexylene diisocyanate, 1,4-phenylene diisocyanate, 2,4- and/or 2,6-toluene diisocyanate (TDI), 1,5-naphthalene diisocyanate, 2,2'- and/or 2,4'- and/or 4,4'-diphenylmethane diisocyanate (monomeric MDI, mMDI), higher homologues (oligomeric MDI) thereof, mixtures of monomeric and oligomeric MDI (polymeric MDI, pMDI), 1,3- and/or 1,4-bis-(2-isocyanato-prop-2-yl)-benzene (TMXDI), 1,3-bis-(isocyanatomethyl)benzene (XDI). There is preferably used as the isocyanate diphenylmethane diisocyanate (mMDI) and, in particular, mixtures of diphenylmethane diisocyanate and polyphenylenepolymethylene polyisocyanate (pMDI). The mixtures of diphenylmethane diisocyanate and polyphenylenepolymethylene polyisocyanate (pMDI) have a preferred monomer content of from 10 to 100 wt. %, preferably from 20 to 80 wt. %, particularly preferably from 30 to 60 wt. %. The NCO content of the polyisocyanate [measured according DIN EN ISO 14896: 2009-07] that is used should preferably be greater than 23 wt. %, more preferably greater than 26 wt. %, particularly preferably greater than 30 wt. %. The functionality of the isocyanate should preferably be from 2.0-3.5, more preferably 2.1-2.9. The viscosity of the isocyanate should preferably be ≤750 mPa*s (at 25° C.), more preferably ≤500 mPa*s (at 25° C.) and particularly preferably ≤300 mPa*s (at 25° C.) [measured according to DIN 53019-1:2008-09]. When used in the invention, the organic polyisocyanates may include dimers, trimers, tetramers or pentamers of the isocyanate and/or a combination thereof.

Modified, capped and prepolymerized isocyanates, which for example may be prepared by reaction of an excessive amount of an organic polyisocyanate or a mixture of organic polyisocyanates with a polyol compound, may also be used as the isocyanate component A). Compounds and methods for production have been described in the technical literature.

Component C) is a radical reaction initiator, which may be added into the isocyanate-reactive component B) or into the isocyanate component A) or into both. The addition into the isocyanate component A) to form a premixed component ("premix") of isocyanate A) and radical reaction initiator C), before mixing with component B), is preferred to avoid early start of the polymerization reaction in the isocyanate reactive component B). The initiator may be selected from peroxides, peroxyesters, ketone peroxides, diacyl peroxides, peroxyketals, peroxycarbonates, persulfides, peroxyboric acid, azo compounds and/or other suitable radical initiators that can initiate curing of a double bond-containing compound. The examples include tert-butylperoxy isopropyl carbonate, tert-butylperoxy 3,5,5-trimethylhexanoate, methyl ethyl ketone peroxide, cumyl hydroperoxide, and tert-butyl peroxybenzoate. Peroxyesters with the following structure II are preferred:

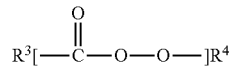

wherein R3 and R4 represent alkyl and/or aryl groups.

tert-Butyl peroxybenzoate, tert-amyl peroxybenzoate and/or tert-amyl peroxyacetate are especially preferred.

If a radical initiator with a peroxyester-functionality having the structure (II) is added, its content, referred to the amount of the carbonylperoxy-moiety [—(C═O)OO]— is preferably 0.1-3 wt.-%, based on 100 wt. % by weight of the isocyanate reactive component, with 0.1-2 wt.-% being especially preferred.

The addition of 1-3 wt. % of t-butyl peroxybenzoate is especially advantageous.

The isocyanate reactive component B) or the polyurethane-polyacrylate reactive composition prepared from B) may further optionally comprise one or more compounds D) which are selected from the group consisting of components being able to act as a radical polymerization accelerators, promoters and suppressants.

The group of reaction accelerators known to the person skilled in the art comprises e.g. transition metal-based salts (e.g. based on platinum, tin, copper, cobalt or iron), amine-based compounds, ammonium salts and aniline compounds. Most of the compounds disclosed in the literature promote or catalyze both, the urethane polyaddition and radical polymerization. Often, the reaction accelerators for the radical polymerization reaction contain mixtures of the before mentioned compounds.

Preferably, the reaction accelerators used in the polyurethane-polyacrylate reactive composition do neither contain catalytically active amines, ammonium salts or potassium salts.

Preferably, the reaction accelerator comprises cobalt(II)-salts. The use of cobalt(II) carboxylate is especially preferred.

Radical reaction suppressants suitable for the invention include polymerization inhibitors, polymerization retarders and the like. Radical reaction suppressants include but is not limited to some phenol, quinine or not catalytically active amine compounds (e.g. sterically hindered amines), examples of which include, p-methoxyphenol, benzoquinone, polymethyl piperidine derivatives, etc.

The isocyanate reactive composition B) or the polyurethane-polyacrylate reactive composition prepared with B) may also comprise further aids or additives. The further aids or additives include but not limited to fillers, inner release agents, flame retardants, smoke suppressants, dyes, pigments, antistatic agents, antioxidants, UV stabilizers, diluents, antifoam agents, coupling agents, surface wetting agents, leveling agents, moisture scavengers, molecular sieves, thixotropic agents, plasticizers, blowing agents, foam stabilizers, foam homogenizers, radical reaction suppressants, or combinations thereof, which may be optionally included in the isocyanate component A) and/or the isocyanate-reactive component B) or added separately to the polyurethane-polyacrylate reactive composition upon mixing.

In some embodiments of the invention, the filler is selected from the group consisting of aluminum hydroxide, bentonite, fly ash, wollastonite, perlite powder, fly ash floating beads, calcium carbonate, talc powder, mica powder, porcelain clay, fumed silica, expandable microspheres, diatomite, pozzuolana, barium sulfate, calcium sulfate, glass microspheres, rock powder, wood flour, wood chips, bamboo flour, bamboo chips, rice grains, chopped crop straw, chopped broomcorn straw, graphite powder, metal powder, recycled powder of thermosetting composite materials, plastic particles or powder, or combinations thereof. The glass microspheres may be solid or hollow.

Inner mold release agents suitable for the invention include any conventional release agents for manufacturing polyurethane, and examples include long-chain carboxylic acids, particularly fatty acids, such as stearic acid; amines of long-chain carboxylic acids, such as stearamide; fatty acid esters; metal salts of long-chain carboxylic acids, such as zinc stearate; or polysiloxanes.

Examples of flame retardants suitable for the invention include triaryl phosphates, trialkyl phosphates, triaryl or trialkyl phosphates containing halogen, melamine, melamine resin, halogenated paraffin, red phosphorus or combinations thereof.

Other aids suitable for the invention include moisture scavengers, such as molecular sieves, silanes or oxazolidines; antifoaming agents, degassing agents, air release agents such as polydimethylsiloxane; coupling agents, such as monoethylene oxide. A coupling agent is particularly preferred for enhancing the binding strength between a resin matrix and a fibrous reinforcement material. Wetting agents are particularly preferred for improving fiber wetting during infiltration of a fibrous reinforcement material. Fine filler, for example, clay or fumed silica, is usually used as a thixotropic agent.

In this application, the term "pot-life" means the time in which the reactive composition has a viscosity@25° C.<600 mPa*s.

For the production of the inventive polyurethane-polyacrylate composite, the polyurethane-polyacrylate reactive composition is mixed with the reinforcement material. Suitable reinforcement material for the invention include glass fibers, carbon nanotubes, carbon fibers, polyester fibers, natural fibers, aramid fibers, nylon fibers, basalt fibers, boron fibers, silicon carbide fibers, asbestos fibers, whiskers, hard particles, metal fibers and combinations thereof.

The use of a core material in combination with a polyurethane-polyacrylate resin matrix and a reinforcement material facilitates the molding of the composite material and the weight reduction of the composite material. A core material commonly used in the art may be used for the polyurethane-polymethacrylate composite material of the invention, examples of which include but are not limited to polystyrene foam such as COMPAXX® foam; polyester PET foam; polyimide PMI foam; polyvinyl chloride foam; metal foams, such as those available from Mitsubishi Co.; balsa wood; and the like.

In an embodiment of the invention, the reinforcement material preferably has an amount of 1-90 wt.-%, more preferably 30-85 wt.-%, most preferably 50-80 wt.-%, based on 100 wt.-% by weight of the polyurethane-polyacrylate composite material.

A preferred process to produce the polyurethane-polyacrylate composite comprising a matrix of a polyurethane-polyacrylate resin combined with the reinforcement material, is the vacuum infusion process, also called Vacuum Assisted Resin Transfer Moulding (VARTM), known to one skilled in the art.

The VARTM process allows the impregnation of reinforcement material with a polyurethane-polyacrylate resin, wherein the driving force for the flow of resin is a pressure difference. The VARTM process, generally involves mixing the partially or un-degassed components of the resin by hand or by using a dosing unit fitted with a mixing chamber, transferring the mixed material to the mould via a resin reservoir placed under atmospheric pressure and atmosphere, before the resin flows into the mould containing the reinforcement material, driven by the pressure difference. A preferred process involves a direct VARTM method, wherein most of dissolved gasses and moisture of the components of a polyurethane-polyacrylate resin are removed under reduced pressure, before they are mixed in a mixing chamber of a dosing unit, which transfers the mixed material directly into the mould containing the reinforcement material, driven by the pressure difference, and without being exposed to the atmosphere.

The polyurethane-polyacrylate reactive composition may as well be used in alternative composite manufacturing processes, e.g. in a process selected from pultrusion, prepreg molding process, filament winding, hand lay-up moulding, spray lay-up moulding and combinations thereof. See Chapters 2 and 6-9 in Composite Material Processes And Equipments (Liu Xiongya, et al., 1994, Publishing House of Wuhan University of Technology) and Christian Bonten: Kunststofftechnik: Einfiihrung and Grundlagen, (Hanser Verlag, 2014, ISBN 978-3-446-44093-7) for details about these processes. This literature is incorporated herein in its entirety by reference.

The polyurethane-polyacrylate reactive composition shows a high conversion ratio when reacted in the one-pot process. The polyurethane-polyacrylate reactive composition is suitable for the vacuum infusion process to prepare a polyurethane-polyacrylate composite material. It overcomes the deficiencies of the prior art with regard to low degree of conversion. The polyurethane-polyacrylate composite prepared by the vacuum infusion process has unique properties such as such as fast curing, low exotherm and excellent mechanical properties, e.g. a high thermal deformation temperature, high tensile and flexural strength, high resistance to fatigue, high ductility, no content of volatile organic compound such as styrene, and low shrinkage rate.

These polyurethane-polyacrylate composite materials prepared with the polyurethane-polyacrylate reactive composition may be used to manufacture wind generator blades, wind generator nacelle housings, watercraft propeller blades, hulls, interior and exterior automobile decorative parts, automobile bodies, radomes, machinery structural members, decorative parts and structural members for architectures and bridges, especially wind generator blades.

The invention will be further illustrated with reference to the following specific examples. However, it is to be appreciated that these examples are only intended to illustrate the invention without limiting the scope of the invention.

EXPERIMENTAL SECTION

Component A

Isocyanate A, having a content of isocyanate group of 31.4 wt. %, and an average functionality of 2.7, available from Covestro Polymers (China) Co., Ltd.;

Component B

B1)
Polyol 1: polyether based on propylene oxide, starter component=glycerol, f=3, OH-value=350 g KOH/g (available from Covestro Polymers (China) Co., Ltd.)
B2)

Hydroxypropyl methacrylate (HPMA), OH-value=389 mg KOH/g, f=1, f(vinyl)=1 from Evonik.

B3)

Adjuvant: 1,1'-Diphenylethylene (DPE, from Sigma Aldrich, analytical grade)

Promoter: NL-49P (from AkzoNobel)

Component C t-Butyl peroxybenzoate (Trigonox® C from AkzoNobel)

Degree of Conversion

The conversion ratio of NCO can be determined by quantitative IR analysis as follows: Wave number of NCO IR absorbance peak is ~2260 cm$^{-1}$. The NCO peak area of the liquid resin immediately after mixing is determined as x, and NCO peak area of residual NCO is determined as y. Then the NCO conversion ratio is then calculated as $\{1-(y/x)\}\times 100\%$.

Isocyanate Index

The isocyanate index ("Index") in the polyurethane-polyacrylate reaction mixture is determined as follows:

$X(\%)$=([the mole number of the isocyanate group (NCO group) in component $A$])/[the mole number of the isocyanate group-reactive groups in component B]*100% wherein, component A is an organic isocyanate component, component B refers to all the components apart from the isocyanate component.

All the experiments are carried out in the lab at room temperature (~25 degree C.) with ~50% relative humidity. All percentages and parts are based on weights, unless otherwise indicated.

Preparation of the Polyurethane-Polyacrylate Reactive Composition (Examples 1-4)

Component A including Component C was combined with Component B including Component D (respective amounts are given in Table 1, ca. 300 g in total).), then vacuum degassed and mixed for 10 minutes with a rotation speed of 300 rpm, after which the resin mixture was poured into an aluminium mold preheated to 30° C.

The mold was put in a 30° C. oven, and then the components listed in Table 1 were formulated according to proportions. The temperature in the oven rose from 30° C. to 70° C. over 2 hours (5° C. per 15 minutes) and then held at 70° C. for 4 hours. Cured polyurethane resin matrixes of Examples 1, 2, 3 and 4 were obtained.

TABLE 1

Polyurethane Composition and NCO Residual Ratio Thereof

| | | Example 1 (Comparison) | Example 2 | Example 3 | Example 4 |
|---|---|---|---|---|---|
| Formulation | | | | | |
| component B | B1 [g] | 90 | 90 | 90 | 90 |
| | B2 [g] | 73.4 | 73.4 | 73.4 | 73.4 |
| | promoter [g] | 0.15 | 0.15 | 0.15 | 0.15 |
| Component C | [g] | 2.7 | 2.7 | 2.7 | 2.7 |
| Component D | [g] | / | 0.75 | 5 | 10 |

TABLE 1-continued

Polyurethane Composition and NCO Residual Ratio Thereof

| | | Example 1 (Comparison) | Example 2 | Example 3 | Example 4 |
|---|---|---|---|---|---|
| (DPE) component A | [g] | 142.9 | 142.9 | 142.9 | 142.9 |
| Calculated/measured values | | | | | |
| NCO residue (%) | | / | 20 | 15 | 12.5 | 9.8 |
| increased percentage of conversion of the residual NCO | | / | 0 | 25 | 37.5 | 51 |
| Isocyanate Index (%) | | / | 100 | 100 | 100 | 100 |

It was found by comparing the Comparative Example 1 with Examples 2, 3 and 4, that after a suitable amount of DPE was incorporated, the conversion ratio of NCO of the resin was increased significantly, and the conversion ratio of the residual NCO is surprisingly increased by more than 50%.

The invention claimed is:

1. An isocyanate-reactive component B) comprising:

B1) one or more organic polyols comprising one or more polyether polyols, one or more polyester polyols, one or more polyetherester polyols, one or more polymer polyols, one or more polycarbonate polyols, one or more polyethercarbonate polyols, or a combination thereof, wherein the one or more organic polyols B1) have an OH-value of from 150 to 700 mg KOH/g and an average OH-functionality f of from greater than 1 to 4.5;

B2) one or more compounds having the structure of Formula (I)

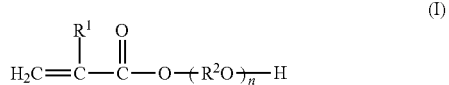

wherein, R$^1$ is selected from the group consisting of hydrogen, methyl or ethyl; R$^2$ is selected from the group consisting of an alkylene having 2 to 6 carbon atoms, 2,2-bis(4-phenylene)-propane,1,4-bis(methylene)benzene, 1,3-bis(methylene)benzene, and 1,2-bis(methylene)benzene; n is an integer from 1 to 6; and B3) at least one radical reaction adjuvant comprising a diaryl-substituted ethylene.

2. An isocyanate-reactive component B) according to claim 1, comprising from 30 to 80 wt. % of the one or more organic polyols B1), based on a total weight of said isocyanate reactive component B).

3. An isocyanate-reactive component B) according to claim 1, wherein B1) comprises a polyether polyol, a polyester polyol, or a combination thereof.

4. An isocyanate-reactive component B) according to claim 1, comprising from 21 to 75 wt. % of the one or more compounds B2), based on a total weight of said isocyanate-reactive component B).

5. An isocyanate-reactive component B) according to claim 1, comprising from 0.1 to 12 wt. % of the at least one radical reaction adjuvant B3), based on the total weight of said isocyanate-reactive component B).

6. An isocyanate-reactive component B) according to claim 1, wherein component B3) is diphenylethylene.

7. A polyurethane—polyacrylate reactive composition, comprising: a reaction product of the isocyanate-reactive component B) of claim 1 and an isocyanate component A) comprising one or more organic polyisocyanates, wherein component B) and component A are mixed in a one-pot process in the presence of a radical reaction initiator C).

8. A polyurethane—polyacrylate reactive composition according to claim 7, wherein the isocyanate component A) comprises 10 to 100 wt. % diphenylmethane diisocyanate and 0 to 90 wt. % polyphenylenepolymethylene polyisocyanates based on a total weight of the isocyanate component A).

9. A composite manufacturing method comprising: producing a composite comprising the polyurethane-polyacrylate reactive composition of claim 7 via a process comprising a pultrusion process, a prepreg molding process, a filament winding process, a hand lay-up moulding process, a spray lay-up moulding process, or a vacuum infusion molding process.

10. A composite manufacturing method according to claim 9, wherein the process is the vacuum infusion molding process.

11. A composite produced by the method of claim 9.

12. An article, comprising the composite of claim 11, wherein the article comprises a wind generator blade, a wind generator nacelle housing, a watercraft propeller blade, a hull, an interior automobile decorative part, an exterior automobile decorative part, an automobile body, a radome, a machinery structural member, a decorative architectural part, a structural architectural member, or a combination thereof.

13. An article according to claim 12, wherein the article is the wind generator blade.

\* \* \* \* \*